ABSTRACT OF THE DISCLOSURE

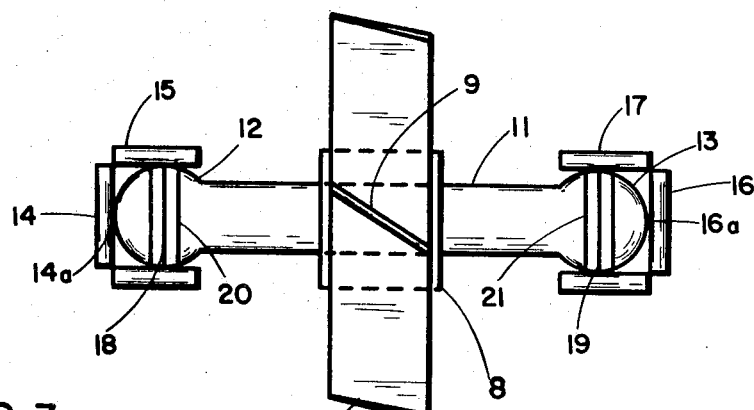
FIG. 3
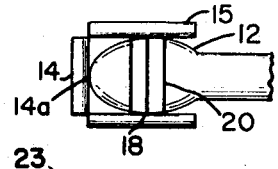
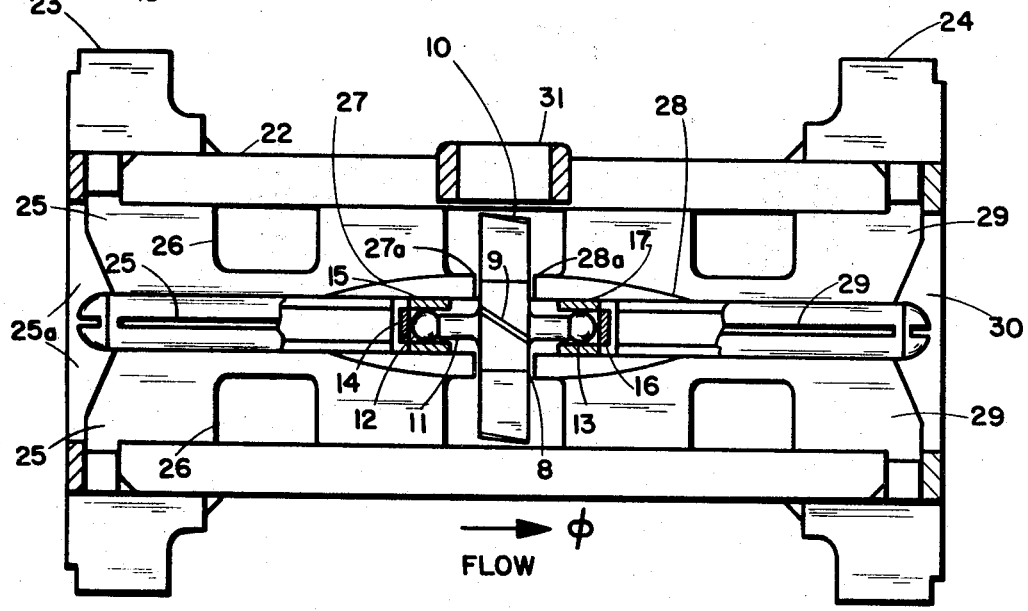
FIG. 2
INVENTORS
FREDERICK D. EZEKIEL
JOSEPH F. BONARRIGO
BY
ATTORNEY 3,371,531
TURBINE METER BEARING
Frederick D. Ezekiel, Lexington, and Joseph F. Bonarrigo, Pembroke, Mass., assignors to The Foxboro Company, Foxboro, Mass., a corporation of Massachusetts
Filed Oct. 22, 1965, Ser. No. 501,418
18 Claims. (Cl. 73—231)

A turbine meter rotor shaft is supported at its end by tungsten carbide ball bearings fastened thereto, each ball bearing running in a cylindrically-shaped concavity in a bearing housing consisting of an aluminum oxide material.

---

This invention relates to bearings and more particularly to bearings suitable for turbine flowmeter applications.

Turbine meters do not have a constant ratio of output frequency to volumetric flow unless some means of compensation is provided. It is demonstrated that the turbine meter of ordinary configuration with very low friction bearings exhibits a deviation in its output per volume curve in the lower design ranges of flow exceeding the desired 1% band for flowmeter accuracy. It has been suggested that this curve deviation or hump is due to change in viscosity drag on the walls of the turbine meter at lower flow volumes thereby giving rise to a relatively higher velocity of the fluid at intermediary points in the meter passages. Several means have been proposed to reduce this hump in the curve so as to achieve a meter of 1% accuracy throughout the entire range of flow for which it is designed, such as different configurations of vane blades, spacing of internal components of the turbine meter, and the like.

The present invention is directed to increasing the accuracy of a turbine meter by providing therewith a specially designed bearing incorporating an amount of bearing friction having the effect of reducing the hump of the meter output per volume curve and thereby obtaining an accuracy of 1% or better throughout the range of flows for which the turbine meter is designed.

Accordingly, it is an object of this invention to provide a bearing having an amount of bearing friction suitable for use with turbine meters requiring a constant ratio of output frequency to volume flow rate over its design range.

It is another object of this invention to provide a bearing for turbine flowmeters lubricated by the fluid passing therethrough for measurement, which bearing exhibits a minimum viscous effect resulting from shear forces upon the fluid in the bearing.

It is another object of this invention to provide a bearing having the amount of friction drag required to smooth the calibration curve of a turbine meter at its low range without appreciably affecting the curve over the upper ranges of flow.

It is another object of this invention to provide a bearing for turbine meters that is lubricated by the fluid passing through the meter and which has an inherent ability to operate efficiently with a considerable amount of dirt and foreign material in the lubricating fluid.

It is another object of this invention to provide a bearing configuration for turbine meters that is adaptable to support a turbine rotor and allow the turbine rotor to be assembled in the meter with a minimum requirement for accurate tolerances and alignment.

It is another object of this invention to provide a bearing for use in a turbine flowmeter that permits interchanging of parts.

It is another object of this invention to provide a long lasting bearing configuration having high reliability under severe operating conditions.

Other objects and advantages of this invention will become apparent from the description taken in conjunction with the drawings, in which:

FIGURE 1 is a cross-section of a turbine rotor mounted on an axis having a bearing at either end; and FIGURE 2 is a cross-section of a turbine meter employing an embodiment of the invention.

FIGURE 3 illustrates an embodiment of the invention wherein the bearing has a barrel shape.

Referring now to FIGURE 1, turbine rotor 10 is mounted fixedly to axial shaft 11. To either end of shaft 11 are fixedly mounted generally spherical bearings 12 and 13. Bearing 12 is axially supported by end plate 14 and is radially supported by cylindrically-shaped housing 15. Similarly, bearing 13 is axially supported by end plate 16 and radially supported by housing 17.

Illustratively, bearings 12 and 13 are formed from tungsten carbide, end plates 14 and 16 are cut from sapphire and housings 15 and 17 are machined from an aluminum oxide material. Other durable material combinations may be used in the bearing configuration, such as are appropriate to operating characteristics as temperature, fluid chemistry, or contamination of the fluid.

By suitable internal configuration of the turbine meter, conveniently adjusting the ratio of the rotor hub to the flow passage dimensions in the meter. The axial load on end plate 14 or end plate 16, as the case may be depending upon the direction of flow through the flowmeter and the resulting thrust therefrom, is held to a minimum. In one direction of flow bearing 13 contacts end plate 16 at region 16a, and in the other direction of flow, bearing 12 contacts end plate 14 at region 14a.

Regions 14a and 16a, under conditions of exact alignment as between the supporting housings 15 and 17 of bearings 12 and 13, are coincident with the center of rotation of shaft 11 and thus provide contact at points of lowest velocity of shaft 11. These regions 14a and 16a are radially displaced from the center of rotation of shaft 11 as a function of the deviation from exact alignment as between bearing housings 15 and 17 of bearings 12 and 13 respectively.

Radial loads are supported by the respective housings 15 and 17 at their contact upon their inner faces with the circumferences 18 and 19 of bearings 12 and 13, respectively, such circumferences being formed on sections normal to the axis of rotation of shaft 11. Bearing 12 thereby makes what is called a line contact along circumference 18 with the inner bore of housing 15, as does bearing 13 make line contact along circumference 19 with the inner bore of housing 17. Circumference 18 of bearing 12 is on its greatest cross section or maximum diameter, thereby providing the highest tangential velocity on bearing 12. Loads passed along a line contact are said to result in an extremely high stress therein. In practice, due to tolerances and wearing in, bearing 12 will eventually exhibit a flat about its circumference 18 having a width equidistant from circumference 18. This flat may be machined onto bearing 12 beforehand to obtain the desired bearing tolerances. The contact of circumference 18 with housing 15, or more specifically, the effect of flat 20 contact upon the inner bore of housing 15 provides the desired friction-loading of bearing 12 in combination with its housing 15.

The width of flat 20 is of a dimension small enough so that the viscous effect from the fluid in the flowmeter is negligible, and consequently little or no lift upon the bearing develops therefrom. Tolerance between flat 20 and the inner bore of housing 15 also determines characteristics of bearing friction.

It is found that the greater tangential velocity along circumference 18 as compared with tangential velocity at points adjacent to flat 20, for example, thereby results in solid particles in the turbine fluid to be dispelled away from the point of contact between bearing 12 and the inner bore of housing 15. Bearing 13 operates in conjunction with housing 17 in the same manner as described for bearing 12 and housing 15.

As an alternative, in line with the concept of the invention, an embodiment, not shown, may be employed using conical housings receiving spherical bearings 12 and 13 rather than the cup-like shape shown in FIGURE 1. In a conical configuration, axial and radial load will both be supported upon a line of each spherical ball defined by a section therethrough making contact with the inner faces of the conical housing.

In practice, it has been found that flats 20 and 21 on bearings 12 and 13 respectively tend to wear in over continued operation of the shaft and rotor under relatively heavy loads. The rate of wear is highest at the incipience of the wear, inasmuch as the contact is essentially along the line when the bearing is perfectly spherical. As the flat 20 increases in width along circumference 18, the rate of wear drops off increasingly, and eventually a flat 20 is obtained of a sufficient width to make any further increase in wear for all practical purposes negligible. For a one-quarter inch diameter sphere for bearing 12, a flat of one thirty-second inch is found to be highly stable in wearing characteristics. This flat may be machined onto surface of bearing 12 prior to assembly and use of the turbine meter, thereby effectively providing a pre-broken-in bearing configuration whose characteristics are thenceforward not appreciably altered. Thereby, also, the tolerance between bearing 12 and the bore of housing 15 may be held substantially constant.

Bearings 12 and 13 may have other configurations than spherical, such as barrel-shaped with any curvature of radius, ellipsoid, paraboloid, or indeed any suitable shape that is round with respect to the axis of rotation. Shape of bearing 12 making two or more line contacts with housing 15 are comprehended among the generality of possible shapes.

The curvature of the barrel shape, for example, may reduce the tendency of a flat 20 to wear-in, and bearing 12 may operate indefinitely essentially with the original shape. Those shapes having reduced curvatures in the regions of contact with housing 15 along greatest diameter circumference 18 may eliminate the need for premachining flat 20, as initial wear may be negligible and tolerances may be stable.

Referring now to FIGURE 2, a cross section of a turbine meter device is shown embodying the invention. Housing 22 is attached by flange 23 to a flow inlet and is attached by flange 24 to a flow outlet. The flow in arrives through a conduit, not shown, and strikes edges 25a of vanes 25. The flow is guided along vanes 25 towards rotor 10 passing cut-outs 26 in vanes 25 which tends to allow the flow to stabilize. The flow passes along the outside surface of nose cone 27 whose interior is adapted to receive one of the bearing configurations. From the termination 27a of nose cone 27, the flow passes through blades 9 of rotor 10 thereby impelling them in a tangential motion. The flow exits from blades 9 and passes along the outer surface of cone 28 and is guided by vanes 29 to exit 30 of the meter. Blades 9 of rotor 10, while rotating have their tips each pass proximate to magnetic pick-up 31, and each blade tip in sequence induces a pulse in pick-up 31, which series of pulses serves as the measuring output of the flowmeter. For a meter having a constant factor, the pulse frequency should be proportional to the volume per unit time of fluid passing through the meter.

Bearing 12 rides in housing 15 which is supported within the center of nose cone 27. Nose cone 27 is integral with vanes 26 which mount the entire combination to the interior of the flowmeter housing 22. Similarly, bearing 13 in housing 17 is supported in cone 28 which is mounted to the housing 22 by vanes 29. In the described direction of flow, the thrust upon rotor 10 is directed upon end plate 16. The shaft 11 connecting bearings 12 and 13, supports rotor 10 consisting of hub 8 and blades 9 affixed thereto. If the diameter of hub 8 is smaller than the greatest diameter at points 27a and 28a of cones 27 and 28 respectively, it is found the axial loads on the bearing receiving the thrust load, 12 or 13 as the case may be, is reduced. In the described direction of flow, a low pressure area appears at the greatest diameter 27a of nose cone 27 owing to the increased velocity of the fluid at it is constricted by nose cone 27 to a minimum cross sectional width at edge 27a. On the other hand, a relatively higher static pressure appears in the region of hub 8 as a result of the reduction in fluid velocity in the region of lower constriction about hub 8. This arrangement provides a differential pressure across hub 8 resulting in a reverse thrust upon rotor 10 tending to cancel the forward thrust upon rotor 10 resulting from the fluid passage. The remaining small downstream thrust is purposely designed into the flowmeter to set the rotor bearings.

It is to be noted that housing 15 need not be perfectly axially aligned with housing 17 inasmuch as bearings 12 and 13 are essentially spherical and may be swivelled over a relatively wide tolerance. This latitude in tolerance allows for easier and greater ease of assembly of the meter. In addition, the permissible tolerance with the present invention permits interchangeability of parts during field repair with no loss of meter accuracy.

The components of the flowmeter of FIGURE 2 are symmetrical with respect to flow in either direction; consequently, flow may be reversed therein and the calibration will remain the same.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:
1. A bearing configuration comprising:
   a bearing each cross section of which taken normal to its axis is circular and centered on said axis, and
   a bearing housing consisting of an aluminum oxide material having a concavity therein each cross section of which taken normal to an axis of said housing is circular and centered on said axis of said housing and said concavity being adapted to receive said bearing in contact therewith along a flattened strip about the largest circumference of said bearing whereby said bearing is supported relative to said bearing housing.
2. The bearing configuration of claim 1 incorporated in a turbine flowmeter.
3. A bearing configuration comprising:
   a bearing made of tungsten carbide each cross section of which taken normal to its axis is circular and centered on said axis, and a bearing housing consisting of aluminum oxide material having a concavity therein at least a portion of which is cylindrical and adapted to receive said bearing to make contact therewith along a flattened strip about the circumference of said bearing on its maximum cross-sectional diameter whereby said bearing is radially supported relative to said bearing housing.
4. The bearing configuration of claim 3 with thrust bearing means in fixed relationship to said bearing housing with said thrust bearing means disposed proximate to a termination of said axis of said bearing with its surface to receive axial thrust along the line of said axis between said bearing and said thrust bearing means.
5. A bearing configuration comprising:
   a bearing made of tungsten carbide having an axis of rotation and having a solid shape each cross section of which taken normal to said axis is circular and centered on said axis, a shaft having an axis of rotation coinciding with said axis of rotation of said bearing and having one end thereof fixed to said bearing, and a bearing housing consisting of aluminum oxide material having a cylindrical bore therein adapted to receive said bearing in contact therewith along a flattened strip about the largest circumference of said bearing whereby said bearing and said shaft are radially supported relative to said bearing housing.

6. The bearing configuration of claim 5 incorporated in a turbine flowmeter.

7. The bearing configuration of claim 4 with thrust bearing means in fixed relationship to said bearing housing and said thrust bearing means being disposed proximate to the termination of said axis with its surface opposite said shaft end to receive axial thrust along the line of said axis between said thrust bearing means and the combination of said bearing and said shaft.

8. The bearing configuration of claim 7 incorporated in a turbine flowmeter having the hub of its turbine rotor with a smaller diameter than the diameter of the rotor bearing-supporting nose cone thereby in conjunction with fluid passing through said flowmeter producing a differential pressure having the effect of a reverse thrust upon said turbine rotor.

9. A bearing configuration comprising:
a bearing having an axis of rotation and having a solid shape each cross section of which taken normal to said axis is circular and centered on said axis,
a shaft having an axis of rotation coinciding with said axis of rotation of said bearing and having one end thereof fixed to said bearing,
a bearing housing having a cylindrical bore therein adapted to receive said bearing in contact therewith along a flattened strip about the largest circumference of said bearing.

10. The bearing configuration of claim 9 with said bearing having a spheroid shape.

11. The bearing configuration of claim 9 with said bearing having a barrel shape.

12. A bearing configuration comprising:
a bearing each cross section of which taken normal to its axis is circular and centered on said axis and having a flattened strip along its maximum circumference normal to said axis, and
a bearing housing having a cylindrical bore therein adapted to receive said bearing in contact therewith along said flattened strip whereby said bearing is radially supported with respect to said bearing housing.

13. A bearing configuration comprising:
a bearing having a spheroid shape with a maximum circumference normal to its axis of rotation, and
a bearing housing having a cylindrical bore therein adapted to receive said bearing in contact along said maximum circumference thereof, with said bearing having a flattened strip along its maximum circumference for making contact with said cylindrical bore.

14. The bearing configuration of claim 13 incorporated in a turbine flowmeter.

15. The bearing configuration of claim 13 incorporated in a turbine flowmeter having the hub of its turbine rotor with a smaller diameter than the diameter of the rotor bearing-supporting nose cone thereby in conjunction with fluid passing through said flowmeter producing a differential pressure having the effect of a reverse thrust upon said turbine rotor.

16. The bearing configuration of claim 13 incorporated in a turbine flowmeter having the hub of its turbine rotor with a smaller diameter than the diameter of the rotor bearing-supporting nose cone thereby in conjunction with fluid passing through said flowmeter producing a differential pressure having the effect of a reverse thrust upon said turbine rotor.

17. A bearing configuration comprising:
a bearing having a generally spherical shape with a flattened strip thereon normal to the axis of rotation of said bearing, and
a bearing housing having a cylindrical bore therein adapted to receive said bearing in contact along said maximum circumference thereof.

18. The bearing configuration of claim 17 with a flat thrust bearing in fixed relationship to said bearing housing disposed normal to said axis of rotation and located closely adjacent a rotational pole of said bearing.

References Cited
UNITED STATES PATENTS

| | | | |
|---|---|---|---|
| Re.188,435 | 1/1933 | Skillman | 308—72 |
| 2,673,131 | 3/1954 | Kistler | 308—237 X |
| 2,874,007 | 2/1959 | Cametti et al. | 308—237 X |
| 3,164,020 | 1/1965 | Groner et al. | 73—231 |
| 575,455 | 1/1897 | Berger | 73—231 |
| 633,096 | 9/1899 | Keiper | 308—72 |
| 739,269 | 9/1903 | Tilden | 73—231 |
| 2,845,798 | 8/1958 | Knauth | 73—230 |
| 3,136,159 | 6/1964 | Young | 73—230 |

FOREIGN PATENTS

| | | |
|---|---|---|
| 525,235 | 5/1956 | Canada. |
| 859,077 | 1/1961 | Great Britain. |
| 862,009 | 3/1961 | Great Britain. |

RICHARD C. QUEISSER, *Primary Examiner.*

EDWARD D. GILHOOLY, *Assistant Examiner.*